United States Patent [19]

Schäfer

[11] Patent Number: 5,090,547

[45] Date of Patent: Feb. 25, 1992

[54] FASTENING AND/OR SUPPORT DEVICE FOR ROLLER BARS ON SUPPORT RAILS OR THE LIKE, PARTICULARLY OF CONTINUOUS SHELF SYSTEMS

[75] Inventor: Gerhard Schäfer, Neunkirchen, Fed. Rep. of Germany

[73] Assignee: Fritz Schäfer Gesellschaft mit beschrankter Haftung, Fed. Rep. of Germany

[21] Appl. No.: 678,539

[22] Filed: Mar. 20, 1991

[30] Foreign Application Priority Data

Mar. 21, 1990 [DE] Fed. Rep. of Germany ....... 9003313

[51] Int. Cl.$^5$ .............................................. B65G 13/00
[52] U.S. Cl. ................................... 193/35 R; 211/151
[58] Field of Search ................... 198/860.1; 193/35 R; 414/276; 211/134, 151

[56] References Cited

U.S. PATENT DOCUMENTS

| 4,050,561 | 9/1977 | Seitz | 193/35 R |
| 4,383,614 | 5/1983 | Miller | 211/151 X |
| 4,394,910 | 7/1983 | Miller | 211/151 X |
| 4,453,641 | 6/1984 | Rasmussen et al. | 211/151 |
| 4,790,707 | 12/1988 | Magretta et al. | 414/276 |

FOREIGN PATENT DOCUMENTS

| 8500141 | 4/1985 | Fed. Rep. of Germany. | |
| 8704612 | 7/1987 | Fed. Rep. of Germany. | |
| 3731404 | 4/1989 | Fed. Rep. of Germany | 193/35 R |
| 2366190 | 4/1978 | France | 193/35 R |

Primary Examiner—Robert P. Olszewski
Assistant Examiner—James R. Bidwell
Attorney, Agent, or Firm—Toren, McGeady & Associates

[57] ABSTRACT

A fastening and/or support device for roller bars on support rails which extend transversely of the roller bars, particularly in continuous shelf systems. The device includes locking bars which extend in longitudinal direction of the support rails and can be fastened to the support rails, wherein the ends of the roller bars can be fixed in predetermined locking recesses provided on the locking bars, and wherein the locking recesses are arranged distributed, preferably uniformly, over the longitudinal direction of the locking bar. A head member each is provided between the locking bar and the corresponding end of each roller bar. Each head member has at the underside thereof several locking projections which are spaced from each other at a distance which corresponds to an integer multiple of the difference between two adjacent locking recesses. Each head member can be placed in releasable support engagement through its locking projections with any of the locking recesses of the locking bar and the head member is guided in the locking recess so as to be displaceable over the width of the locking bar. Each head member is provided above the locking projections with coupling engagement members for an end of the roller bar, wherein the coupling engagement members include a transverse stop for an edge of the roller bar.

11 Claims, 6 Drawing Sheets

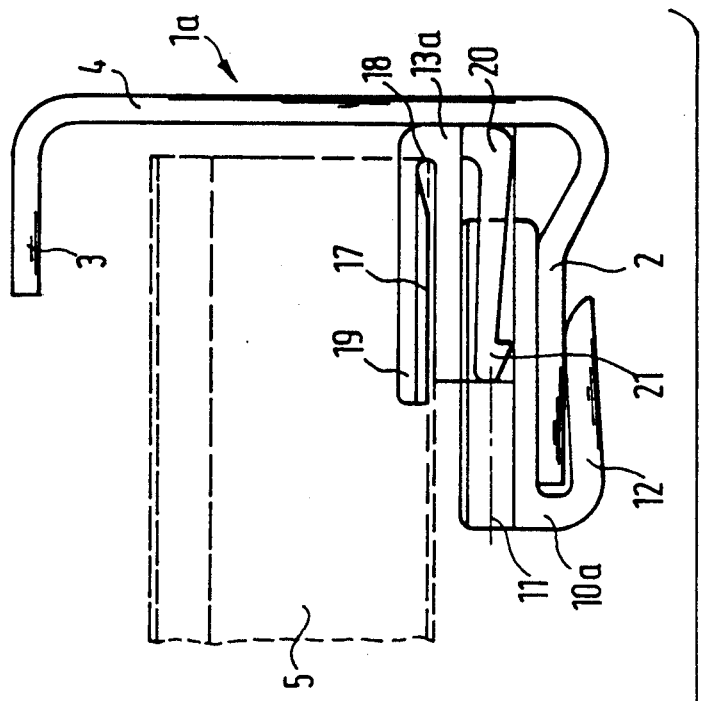
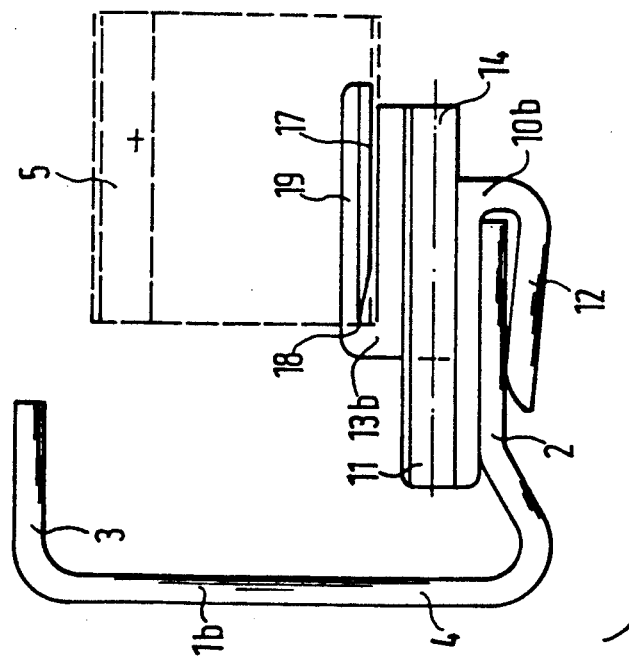
FIG.3

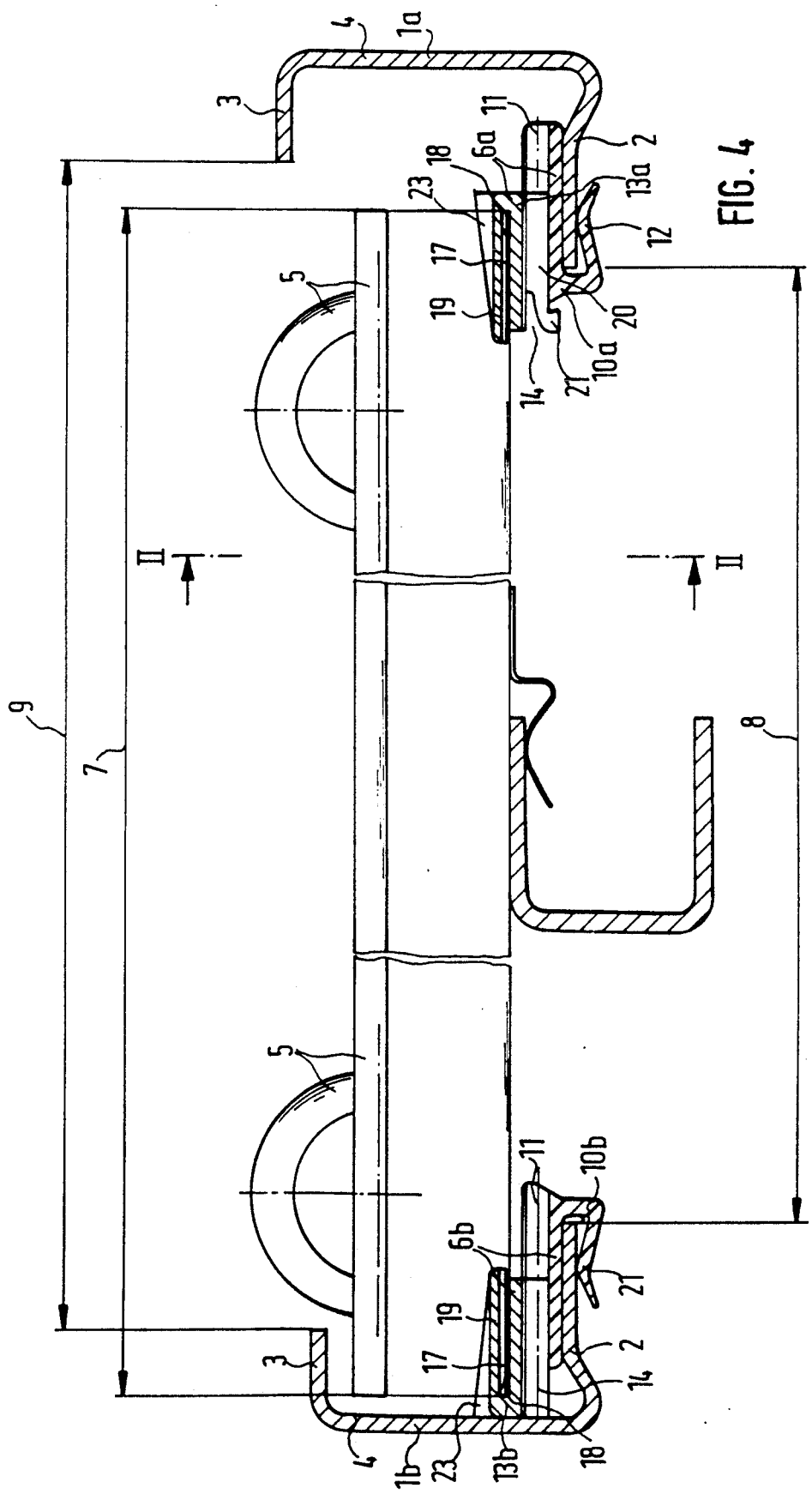

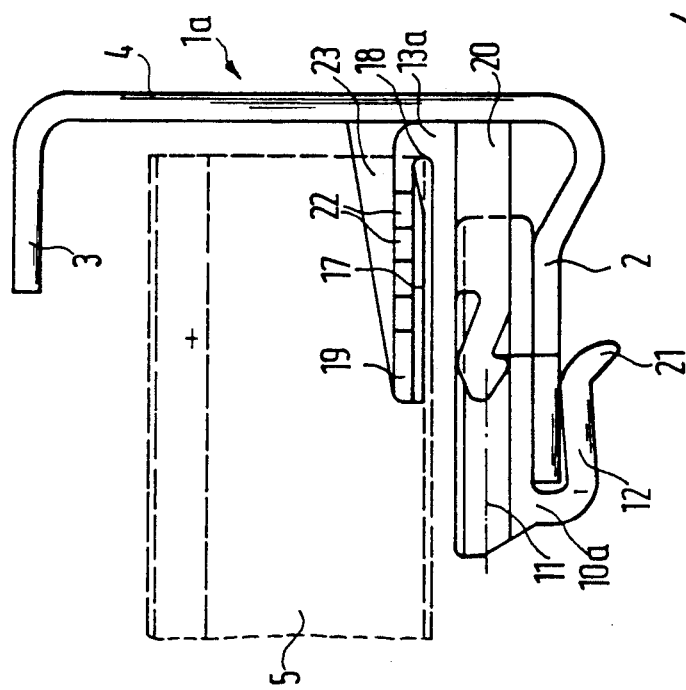
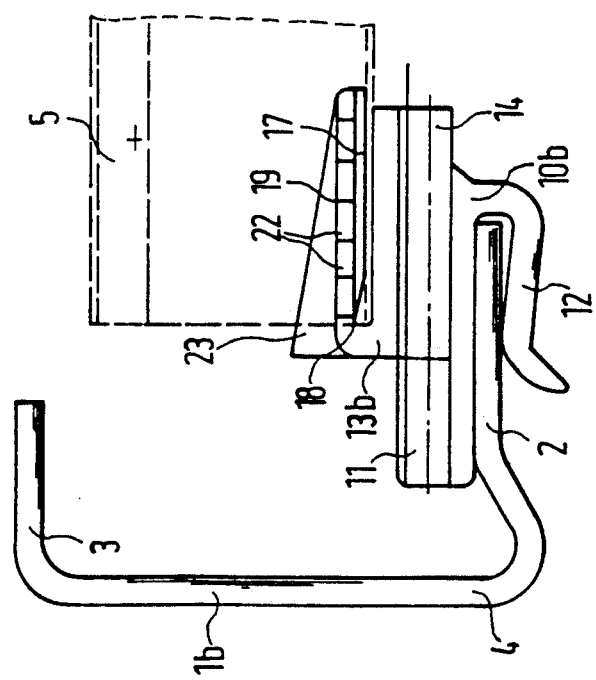
FIG.6

FASTENING AND/OR SUPPORT DEVICE FOR ROLLER BARS ON SUPPORT RAILS OR THE LIKE, PARTICULARLY OF CONTINUOUS SHELF SYSTEMS

BACKGROUND OF THE INVENTION

1. Field of the Invention

The present invention relates to a fastening and/or support device for roller bars on support rails or the like which extend transversely of the roller bars, particularly in continuous shelf systems.

The invention relates particularly to fastening and/or support devices of the type which include locking bars which extend in longitudinal direction of the support rails or the like and can be fastened to the support rails, wherein the ends of the roller bars can be fixed in predetermined locking recesses provided on the locking bars, and wherein the locking recesses are arranged distributed, preferably uniformly, over the longitudinal direction of the locking bars.

2. Description of the Related Art

Various types of fastening and/or support devices for roller bars on support rails of continuous shelf systems are already known, for example, from DE-GM 85 00 141 and DE-GM 87 04 612.

In the fastening and/or support device of DE-GM 85 00 141, the locking recesses for fixing the ends of the roller bars are provided directly on or in a horizontal web of the support rails and interact with a connecting element of plastic material which is placed on the end of the roller bar to be fixed at the locking recess.

This known fastening and/or support device has the disadvantage that the support rails of the continuous shelf systems or the like serving to support the roller bars must be prepared from the outset for the use of the fastening and/or support device, i.e., the support rails must be provided with the locking recesses.

Another disadvantage of this known fastening and/or support device is the fact that the interaction of the connecting elements with the ends of the roller bars requires a relative adaptation of the interacting coupling means because the outwardly extending webs of the connecting elements which are U-shaped in cross-section interact through locking hooks with longitudinal beads at the free ends of the web of the U-shaped roller bar.

The above-described disadvantages are avoided in a fastening and/or support device according to DE-GM 87 04 612 because the device uses locking bars which extend in longitudinal direction of the support rails or the like and which can be fastened to the support rails, wherein the roller bars can be fixed with their ends on the locking bars in predetermined locking recesses independently of a special configuration of the roller bars.

However, this known fastening and/or support device has the disadvantage that the roller bars can be displaced on the locking bars in longitudinal direction by a distance which makes it possible that at least at one end the roller bars are uncoupled from the locking recesses, so that undesirable displacements of the locking recesses occur also in lateral direction, which then cause at least interruptions in the operation of the continuous shelf systems or the like.

SUMMARY OF THE INVENTION

Therefore, it is an object of the present invention to provide a fastening and/or support device in which the above-described disadvantages of the known devices are eliminated. In particular, it is an object of the invention to provide a fastening and/or support device of the above-described type for roller bars on support rails or the like, which can be mounted without problems at any time, i.e., also subsequently, while simultaneously preventing undesirable uncoupling of the roller bars from the support rails or the like.

In accordance with the present invention, a head member is provided between the locking bar and the corresponding end of each roller bar. Each head member has at the underside thereof several locking projections which are spaced from each other at a distance which corresponds to an integer multiple of the distance between two adjacent locking recesses in the locking bar. Each head member can be placed in releasable support engagement through its locking projections with any of the locking recesses of the locking bar and the head member is guided in the locking recess so as to be displaceable over the width of the locking bars. On the other hand, each head member is provided above the locking projections with coupling engagement means for an end of the roller bar, wherein the coupling engagement means include a transverse stop for an end edge of the roller bar.

The fastening and/or support device for roller bars according to the present invention has the particular advantage that the roller bars securely maintain the mounted position even if they are displaced in longitudinal direction to a limited extent between the support rails which support the roller bars.

The fastening and/or support device according to the present invention is particularly suitable for use in connection with support rails which are at least approximately L-shaped in cross-section, wherein the locking bar which supports the ends of the roller bars is mounted on the horizontal web of the the L-shaped support rails.

In the case of L-shaped support rails, the locking bar can be coupled to the horizontal web of the support rail through a hook-shaped clamping section provided on the underside of the locking bar. The length of the head members which can be coupled to the locking bar is smaller than the distance between the outer longitudinal edge of the locking bar and the inner surface of the upright web of the approximately L-shaped support rail. Each head member has at the top thereof a hook-shaped clamping lug as a support engagement means for an end of a roller bar, wherein the free hook side of the clamping lug extends in an opposite direction of the free hook side of the clamping section of the locking bar. Each head member can be displaced on the locking bar by a distance which is smaller than the depth with which the hook-shaped clamping lug extends into the end of the roller bar. Each roller bar has a length which is shorter by at least twice the displacement distance of a head member on a locking bar than the inside distance between the inner surfaces of the upright webs of two oppositely located support rails.

If it is ensured in such a device according to the present invention that the clamping force of the hook-shaped clamping lug of the head members on the roller bars is greater than the frictional resistances occurring between the locking projections of the head members and the locking recesses of the locking bars, it is effectively ensured that undesirable uncoupling of the roller bars does not occur in the fastening and/or support device.

In accordance with a useful feature according to the invention, the locking bars and the head members are made of a plastic material which is resistant to breaking. It has been found particularly useful if the locking bar is of polypropylene, while the head members are of polyamide.

In accordance with another feature of the invention, the locking recesses of the locking bars are undercut grooves which are open toward the top, while the locking projections of the head members are formed on the underside by sectional webs of complementary cross-section. The locking recesses and the locking projections may each have undercut portions with circular arc-shaped surfaces. In accordance with a particularly advantgeous feature, the distance between the locking projections of the head members corresponds to four spacings between the locking recesses of the locking bar.

In accordance with a particularly advantageous further devlopement, at least one head member of each pair of head members which can be coupled to the roller bar has on the underside thereof at least one snap-type hook which extends parallel to the locking projections and which forms with the longitudinal edge of the locking bar a limiting stop for the displacement of the head member relative to the locking bar when both head members of the respective pair of head members are properly in engagement with the opposite ends of the roller bars.

In accordance with another important feature, the snap-type hook is located in the region of a locking recess of the locking bar and is received in this locking recess with spring pretensioning which acts in a direction away from the underside of the head member. If, in this case, the roller bar is pushed after coupling with the two head members of the corresponding pair of head members in the direction of a predetermined position of operation, the snap-type hook automatically becomes effective and fixes this position of operation of the roler bar and, thus, acts as the limiting stop for the movement of the roller bar.

In this connection, it has been found useful if the free end of the snap-type hook is located adjacent the free end of the hook-type clamping lug of the head member, so that the structure of the respective head member is simplified.

Finally, in accordance with another feature of the fastening and/or support device for roller bars on support rails of continuous shelf systems, the ends of the roller bars at the removal side of the continuous shelf system are supported through the head members on the upright web of the corresponding L-shaped support rail, while the ends of the roller bars on the feeding side of the continuous shelf system are releasably fixed through the head members and the corresponding snap-type hook at a distance from the upright web of the adjacent L-shaped support rail.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIG. 3 shows, on a larger scale, the end portions of the fastening and/or support device according to FIG. 1, wherein the roller bar is shown in an intermediate position of assembly;

FIG. 4 is a view corresponding to FIG. 1, showing a modified embodiment of the device according to the invention;

FIG. 6 is a view corresponding to FIG. 3, of the embodiment of FIG. 4; and

DESCRIPTION OF THE PREFERRED EMBODIMENT

Figure 1:
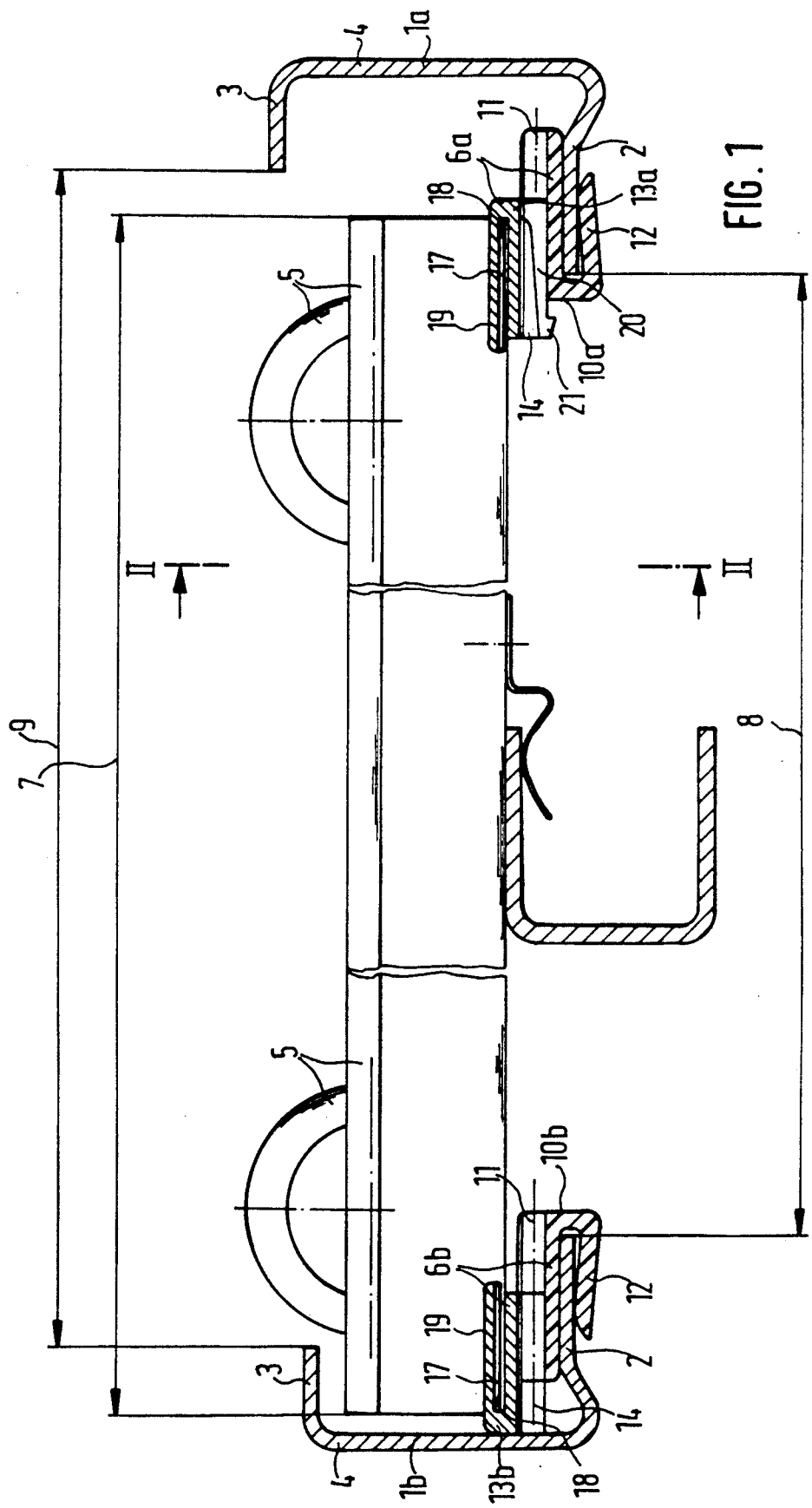
FIG. 1 is partially a sectional view and partially a side view of a fastening and/or support device for roller bars on support rails of a continuous shelf system.

FIGS. 1 and 3 of the drawing show for simplicity's sake of a continuous shelf system only the two support rails 1a and 1b.

The support rails 1a and 1b are provided on the feeding side and on the removal side of the shelf system, respectively. The two support rails 1a and 1b have essentially the same cross-sectional shape and are arranged in a mirror-inverted arrangement relative to each other. The support rails each have an approximately L-shaped cross-section with a lower horizontal web 2 of greater width and an upper horizontal web 3 of smaller width and an upright web 4 which connects webs 2 and 3.

The support rails 1a and 1b are mounted in the continuous shelf system in such a way that at least the lower horizontal webs 2 are located on the same vertical level. However, the upper horizontal web 3 of the support rail 1a on the feeding side may be located by a certain dimension higher than the upper horizontal web 3 of the support rail 1b on the removal side.

Roller bars 5 are mounted in the support rails 1a and 1b in such a way that they extend essentially transversely to the support rails 1a and 1b and are in connection with the support rails 1a and 1b through special fastening and/or support devices 6a and 6b. As can be clearly seen in FIGS. 1 and 3 of the drawing, each of these support devices 6a and 6b interact with the lower horizontal web 2 of the support rails 1a and 1b.

As shown in FIG. 1, the roller bars 5 have a length 7 which is greater than the distance 8 between the opposite longitudinal edges of the lower horizontal webs 2 of the two support rails 1a and 1b. However, the length 7 of the roller bars 5 should not be greater or should only be insignificantly greater than the distance 9 between the opposite longitudinal edges of the upper horizontal webs 3 of the two support rails 1a and 1b.

Each fastening and/or support device 6a and 6b includes a locking bar 10a or 10b which extends in longitudinal direction of the support rails 1a or 1b and is fastened to the lower horizontal web 2 of the support rails. The locking bar is preferably an injection molded article of plastic material, for example, polypropylene and has at its upper side a plurality of locking recesses 11. The locking recesses 11 all have the same shape. The locking recesses 11 are preferably undercut grooves which are open at the top and which extend transversely of the longitudinal direction of the locking bar 10a or 10b.

Figure 2:
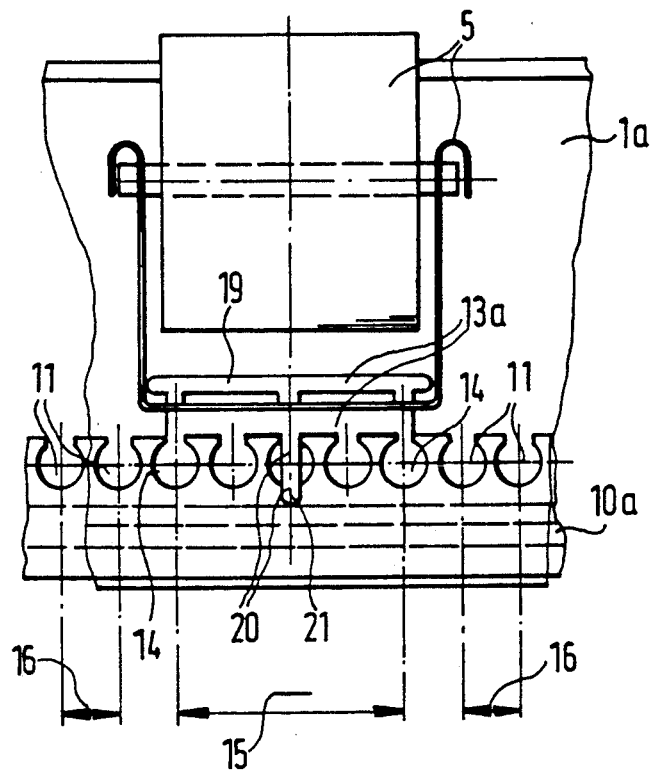
FIG. 2 is a sectional view taken along sectional line II—II of FIG. 1.

It has been found useful to shape the undercut locking recesses 11 in such a way that they have in the portion facing away from the opening a circular arc-shaped surface which extends, for example, over an angle of between 270° and 315°, as can be seen in FIG. 2.

A hook-shaped clamping section 12 is formed integrally to the underside of each locking bar 10a and 10b. The clamping section 12 makes it possible to couple with a plug-type conntection and without play the locking bar 10a or 10b to the lower horizontal web 2 of the support rail 1a or 1b.

Thus, the locking bars 10a and 10b can be coupled to the support rails 1a and 1b without requiring special preparation.

For forming the fastening and/or support devices 6a and 6b, each roller bar 5 is provided with special head members 13a and 13b, such that the head member 13a is provided at one end of the roller bar 5 and the head member 13b is provided on the other end of the roller bar 5.

The head members 13a and 13b each have at the underside thereof several, for example, two locking projections 14. The distance between locking projections 14 corresponds to an integer multiple, for example, four times the distance 16 which is provided between two adjacentlocking recesses 11 in the locking bars 10a and 10b. Thus, as shown in FIG. 2, between the two locking recesses 11 in the locking bars 10a and 10b occupied by the two locking projections 14, three locking recesses 11 remain unoccupied.

The locking projections 14 of each head member 13a or 13b can be releasably engaged with any of the locking recesses 11 of the locking bar 10a or 10b. As a result, the head members 13a and 13b make it possible to arrange the roller bars 5 corresponding to the spacing 15 between the locking recesses 11 at many different locations along the support rails 1a and 1b. The head members 13a and 13b are positively engaged in the locking bars 10a and 10b in such a way that the members 13a and 13b can be moved on the locking bars 10a and 10b over the widths thereof to a limited extent which outwardly is determined by the inner side of the web 4 of the support rails 1a and 1b, as can be seen from a comparison of FIGS. 1 and 3.

For effecting the connection with the roller bar 5, each head member 13a or 13b has above the locking projections 14 coupling engagement means 17 for an end of the roller bar 5.

The coupling engagement means 17 and the transverse stop means 18 of each head member 13a and 13b are formed by a hook-shaped clamping lug 19 which is provided on the upper side of each head member 13a or 13b, as clearly illustrated in FIGS. 1–3 of the drawing. The free web of the clamping lug 19 at the head members 13a and 13b is arranged in such a way that it extends in the opposite direction to the free web of the hook-shaped clamping section 12 on the respective locking bar 10a or 10b, as shown in FIGS. 1 and 3.

The two head members 13a and 13b of each pair of head members 13a/13b have essentially the same shape. The head member 13a differs from the head members 13b only in that it has on its underside additionally at least one snap-type hook 20 which extends parallel to the locking projections 14 and whose end 21 is capable of interacting with the inner longitudinal edge of the locking bar 10a in order to provide a limiting stop for the movement of the head member 13a relative to the locking bar 10a.

As can be seen in FIG. 2, the snap-type hook 20 is located approximately in the middle between the two locking projections 14 at the underside of the head member 13a, such that it can be received within one of the locking recesses 11 of the locking bar 10a.

As FIGS. 1 and 3 further show, the free end 21 of the snap-type hook 20 is located adjacent the free end of the hook-shaped clamping lug 19 on the head member 13a. In addition, in the position of displacement of the head member 13a shown in FIG. 1, the end 21 is located outside of the locking recess 11 in front of the longitudinal edge of the locking bar 10a, while in the other position of displacement of the head member shown in FIG. 3, the end 21 is located within the locking recess 11.

In order to assemble the roller bar 5 in a continuous shelf system, initially the locking bars 10a and 10b are pushed from the inside toward the outside onto the lower horizontal web 2 of the support rails 1a and 1b and are fixed on the web 2 by the hook-shaped clamping sections 12. Subsequently, the head members 13a and 13b can be displaceably connected to the locking bars 10 and 10b through the locking recesses 11 and the locking projections 14, such that the head members 13a and 13b rest against the inner side of the upwardly extending web 4 of the support rails 1a and 1b.

Each roller bar 5 is then first pushed with its one end into the coupling engagement means 17 of the head member 13a, as can be see in FIG. 3. The other end of the roller bar is then moved in front of the other head member 13b, so that the head member 13b can be pushed with the coupling engagement means 17 over the adjacent end of the roller bar 5 into the coupling position shown in FIG. 3. The roller bar 5 can now be pushed together with the two head members 13a and 13b toward the left from the position shown in FIG. 3 into the position shown in FIG. 1 until the head member 13b again rests against the inner side of the upwardly extending web 4 of the support rail 1b. During this displacement, the end 21 of the snap-type hook 20 located at the head member 13a is moved out of the region of the locking recess 11 and moves resiliently downwardly in front of the inner longitudinal edge of the head member 10a, as can be seen in FIG. 1. Thus, the snap-type hook 20 and the head member 13a prevent the roller bar 5 from being pushed from the position of FIG. 1 back into the position of FIG. 3.

The fastening and/or support deices 6a and 6b each formed by a locking bar 10a and 10b and a plurality of head members 13a and 13b make it possible that roller bars 5 can be relatively easily assembled and disassembled between the support rails 1a and 1b, for example, of continuous shelf systems, while these components are permanently and securely fixed in their position of operation.

The following aspects are of particular importance for the problem-free operation of the fastening and/or support devices 6a and 6b.

The locking bars 10a and 10b can be coupled to the horizontal web 2 of the support rails 1a and 1b by means of a hook-shaped clamping section 12 provided at the underside of the locking bars 10a and 10b. The head members 13a and 13b which can be connected to the locking bars 10a and 10b have a length which is smaller than the distance between the outer longitudinal edge of the respective locking bar 10a or 10b and the inner surface of the upright web 4 of the approximately L-shaped support rails 1a and 1b. Each head member 13a and 13b has on the upper side thereof a hook-shaped clamping lug 19 as coupling engagement means 17 for an end of a roller bar 5, wherein the free web of the clamping lug 19 extends in the opposite direction of the free web of the clamping section 12 of the locking bar 10a or 10b. Each head member 13a and 13b is transversely slidable on the corresponding locking bar 10a or 10b by a distance which is less than the engagement depth of its hook-shaped clamping lug 19 in the end of the roller bar 5. Each roller bar 5 has a length 7 which is shorter by at least twice the displacement distance of a head member 13a or 13b on a locking bar 10a or 10b than the inner distance between the inner surfaces of the upright webs 4 of two oppositely located support rails 1a and 1b.

Moreover, it has been found important for the arrangement of the roller bar 5 on the support rails 1a and 1b of continuous shelf systems that the ends of the roller bars 5 arranged on the removal side of the shelf system are supported through the respective head member 13b relative to the upright web 4 of the respective support rail 1b. The ends of the roller bars 5 arranged on the feeding side of the shelf system, on the other hand, are releasably fixed in their positions through the respective head members 13a and the snap-type hooks 20 at a distance from the upright web 4 of the adjacent support rail 1a.

Figure 5:
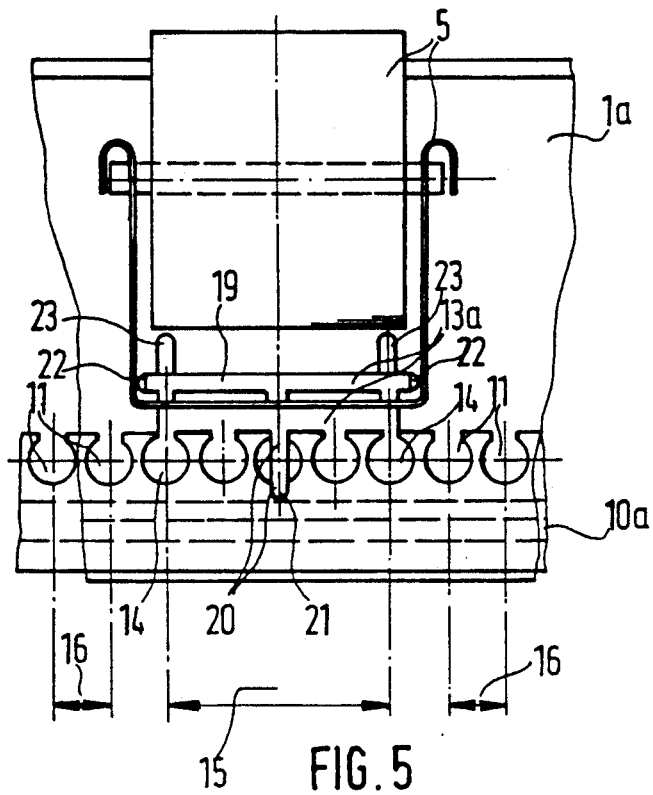
FIG. 5 is a view corresponding to FIG. 2, of the embodiment of FIG. 4.

The fastening and/or support device according to the present invention shown in FIGS. 4-6 corresponds essentially to the device shown in FIGS. 1-3. However, some details have been further developed in an advantageous manner.

For example, FIGS. 4 and 6 show that the free end 21 of the snap-type hook 20 has been changed as compared to FIGS. 1 and 3, i.e., the free end 21 has been provided with a bevel in order to ensure a better limiting stop.

In addition, the curved shape of the clamping section 12 shown in FIGS. 4 and 6 ensures an increased clamping effect. Also, this curved shape facilitates sliding of the locking bars 10a and 10b onto the support rails 1a, 1b.

Figure 7:
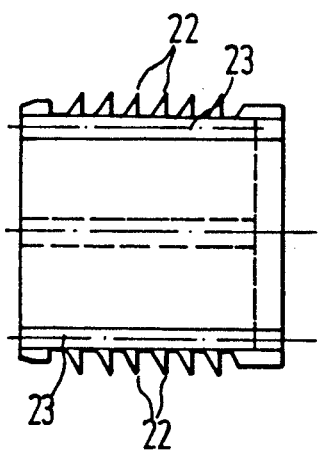
FIG. 7 is a top view of a detail of the embodiment shown in FIGS. 4-6.

As shown in FIGS. 6 and 7, the side edges of the clamping lug 19 engaging in the roller bar 5 has sawtooth-like projections 22 which provide an improved support of the roller bars.

Finally, as FIGS. 4-7 further show, the clamping lugs 19 have triangular stiffening ribs 23 mounted on the upper sides of the clamping lugs 19 and near the side edges thereof. The stiffening ribs 23 provide the clamping lugs 19 with additional stability and prevent the clamping lugs 19 from being bent away when the roller bars 5 are slid on.

While specific embodiments of the invention have been shown and described in detail to illustrate the inventive principles, it will be understood that the invention may be embodied otherwise without departing from such principles.

I claim:

1. In a fastening and/or support device for roller bars on support rails which extend transversely of the roller bars, particularly in continuous shelf systems, the device including locking bars which extend in longitudinal direction of the support rails and can be fastened to the support rails, wherein the ends of the roller bars can be fixed in predetermined locking recesses provided on the locking bars, and wherein the locking recesses are arranged distributed over the longitudinal direction of the locking bars, the improvement comprising a head member each being provided between the locking bar and a corresponding end of each roller bar, each head member having at an underside thereof several locking projections which are spaced from each other at a distance which corresponds to an integer multiple of the distance between two adjacent locking recesses in the locking bar, each head member being in releasable support engagement through its locking projections with any of the locking recesses of the locking bar and each head member being guided in the locking recess so as to be displaceable over the width of the locking bars, and each head member being provided above the locking projections with coupling engagement means for an end of the roller bar, wherein the coupling engagement means includes a transverse stop means for an end edge of the roller bar.

2. The fastening and/or support device according to claim 1, wherein the support rails have at least approximately L-shaped cross-sections, each support rail including a horizontally extending web and an upright web, the ends of the locking bar supporting the roller bar being supported by the horizontal web of each support rail, the locking bar having at an underside thereof a hook-shaped clamping section for coupling the locking bar to the horizontal web of the support rail, the head members having a length which is smaller than the distance between an outer longitudinal edge of the locking bar and an inner surface of the upright web of the support rail, each head member having at a top surface thereof a hook-shaped clamping lug as a support engagement means for an end of a roller bar, wherein a free hook side of the clamping lug extends in an opposite direction of a free hook side of the clamping section of the locking bar, each head member being mounted displaceably on the locking bar by a distance which is smaller than a depth with which the hook-shaped clamping lug extends into an end of the roller bar, and each roller bar having a length which is shorter by at least twice a displacement distance of the head member on a locking bar than an inside distance between the inner surfaces of the upright webs of two oppositely located support rails.

3. The fastening and/or support device according to claims 1 or 2, wherein the locking bars and the head members are of a plastic material which is resistant to breaking.

4. The fastening and/or support device according to claims 1 or 2, wherein the locking recesses of the locking bar are undercut grooves which are open toward the top, and wherein the locking projections of the head members are formed on the underside by sectional webs having a cross-section which corresponds to the cross-section of the grooves.

5. The fastening and/or support device according to claim 4, wherein the locking recesses and the locking projections have undercut portions with circular arc-shaped surfaces.

6. The fastening and/or support device according to claims 1 or 2, wherein the distance between the locking projections of the head members corresponds to four spacings between the locking recesses of the locking bar.

7. The fastening and/or support device according to claim 1, wherein at least one head member of each pair of head members coupled to the roller bar has on an underside thereof at least one snap-type hook which extends parallel to the locking projections and which forms with a longitudinal edge of the locking bar a limiting stop means for the displacement of the head member relative to the locking bar.

8. The fastening and/or support device according to claims 7, wherein the snap-type hook is located in the region of a locking recess of the locking bar and is received in said locking recess with spring pretensioning which acts in a direction away from the underside of the head member.

9. The fastening and/or support device according to claim 7, wherein a free hook end of the snap-type hook is located adjacent a free end of the hook-type clamping lug at the head member.

10. The fastening and/or support device according to claim 7, wherein the shelf system has a feeding side and a removal side, wherein the ends of the roller bars at the removal side are supported through the head members on the upright web of the support rail, and wherein the ends of the roller bars on the feeding side are releasably fixed through the head members and the snap-type hook at a distance from the upright web of the adjacent support rail.

11. The fastening and/or support device according to claim 9, wherein the free end of the snap-type hook is beveled and the clamping section has a curved shape, wherein the clamping lug has side edges which are provided with sawtooth-like projections, and wherein triangular stiffening ribs are provided on the upper sides of the clamping lugs.

* * * * *